United States Patent
Kienhöfer et al.

(10) Patent No.: US 6,931,544 B1
(45) Date of Patent: Aug. 16, 2005

(54) METHOD AND APPARATUS FOR EXECUTING MULTIPLE JAVA(™) APPLICATIONS ON A SINGLE JAVA(™) VIRTUAL MACHINE

(75) Inventors: Jürgen Kienhöfer, Santa Cruz, CA (US); Ranjit Deshpande, Santa Cruz, CA (US)

(73) Assignee: The SCO Group, Inc., Lindon, UT (US)

( * ) Notice: Subject to any disclaimer, the term of this patent is extended or adjusted under 35 U.S.C. 154(b) by 0 days.

(21) Appl. No.: 09/464,352

(22) Filed: Dec. 15, 1999

Related U.S. Application Data

(60) Provisional application No. 60/112,803, filed on Dec. 18, 1998.

(51) Int. Cl.[7] .............................. H04L 9/00; G06F 9/44
(52) U.S. Cl. ..................... 713/200; 709/1; 709/316; 717/118; 717/119; 717/166
(58) Field of Search ................................ 713/201, 166, 713/200; 717/148, 119, 118, 166; 709/316, 709/1

(56) References Cited

OTHER PUBLICATIONS

Hawblitzel, et al., "Implementing Multiple Protection Domains In Java", Proceedings of the USENIX 1998 Annual Technical Conference, Jun. 15-19, 1998, pp. 259-270.

Balfanz, et al., "Experience with Secure Multi-Processing in Java", Proceedings of the 18th International Conference on Distributed Computing Systems, May 26-29, 1998, pp. 398-405.

"Sun Announces Availability of the Java HotSpot Performance Engine", Apr. 27, 1999.

"The Java HotSpot™ Virtual Machine", copyright 2001.

"Java in the Enterprise: A Journey to Reliable Distributed Applications", copyright 2000-2001.

"Redefining the Open Architecture: WebGain's Unique Approach to Developing Distributed Applications in Java™", copyright 1998-2001.

"Building Distributed Java™ Applications for the Enterprise: How WebGain™ Makes It Easy", copyright 1998-2001.

*Primary Examiner*—Gregory Morse
(74) *Attorney, Agent, or Firm*—Madson & Metcalf

(57) ABSTRACT

A modified JAVA(™) execution environment is described. The modified environment supports multiple JAVA(™) applications on a single JAVA(™) virtual machine (JVM). This modified environment provides significant memory and performance improvements when running multiple applications on a single computer system. Notably, no changes are needed to the source code of an application to take advantage of the modified environment. Further, embodiments of the invention may support shared access to base classes through the use of overlays. Additionally, system resource permissions can be enforced based upon the user permissions associated with a running application. Notably, embodiments of the invention allow multiple applications to share the abstract window toolkit (AWT) on a per display basis. Since only a single garbage collection routine is necessary, applications see improved performance relative to running in different JVMs. Further, the shared base classes eliminate significant memory overhead.

11 Claims, 1 Drawing Sheet

METHOD AND APPARATUS FOR EXECUTING MULTIPLE JAVA(™) APPLICATIONS ON A SINGLE JAVA(™) VIRTUAL MACHINE

RELATED APPLICATIONS

This application relates to, incorporates by reference, and claims priority from, U.S. Provisional Patent Application Ser. No. 60/112,803 entitled, "Method and Apparatus for Executing Multiple JAVA Applications on a Single JAVA Virtual Machine", filed Dec. 18, 1998, having inventor Dr. Jürgen G. Kienhöfer.

BACKGROUND OF THE INVENTION

1. Field of the Invention

This invention relates to the field of improved execution environments for software applications running in the JAVA(™) language. In particular, the invention relates to improvements designed to support the operation of multiple unmodified JAVA(™) applications on an unmodified JAVA(™) Virtual Machine.

2. Description of the Related Art

1. Description of Problem

JAVA(™) applications are transportable byte codes that can be executed on a number of platforms. The execution environment for JAVA(™) applications is a JAVA(™) Virtual Machine (JVM). For each platform a JVM must be available to execute the JAVA(™) applications. The specification of, and the implementation of, a JVM is described in documents such as "JAVA(™) Virtual Machine", John Meyer and Troy Downing, O'Reilly and Associates, 1997. Additionally, the book "The JAVA(™) Virtual Machine Specification", Tim Lindholm and Frank Yellin, Addison Wesley, 1997, also describes a JVM.

For each JAVA(™) application that a user wishes to run on a JAVA(™) Virtual Machine, a separate JVM must be run together with a separate execution environment. This execution environment includes an object store in memory, also referred to as a JAVA(™) heap, for storing JAVA(™) objects and data. Also, the environment includes a "garbage collector" that deletes unused objects and compacts the JAVA(™) heap. This arrangement consumes large amounts of system memory or each JVM, and thus each application. When used, as JAVA(™) was originally designed on a client computer, this is riot a problem as a user is typically running only one or two applications at a time. Further, the user's computer is dedicated to running those applications.

In contrast, server computers may require that multiple JAVA(™) applications be running simultaneously. For example, a server might be deployed to handle processing for a large number of client computers. If the JAVA(™) standard is followed, each of running JAVA(™) application on the server would need to run in separate JVM's, each with an associated execution environment. Thus, each application would have its own JAVA(™) heap and separate garbage collection process. The multiplicity of the garbage collection processes across all of the JVM's can consume significant amounts of processor time and lead to decreased performance.

The JAVA(™) Virtual Machine could be rewritten in its entirety to support multiple applications at one time. However, such an approach would require major re-architecting of the JAVA(™) and/or JVM standards and specifications. Additionally, JAVA(™) applications could be rewritten in source code to support multiple applications on a single JVM.

2. Prior Art JAVA(™) Execution Environment

Turning to FIG. 1, and the prior art JAVA(™) execution environment, the execution environment includes a JAVA(™) Virtual Machine 100, including JAVA(™) base classes 102 and a primordial class loader 104. An optional application class loader 106 is depicted as well as a single JAVA(™) application 108. This is the typical JAVA(™) execution environment according to the prior art.

In the normal operation of a JVM, a JAVA(™) application compiled to run on the JVM arrives in a sequence of byte codes arranged in class files. The class files, which can be remotely or locally accessed, are loaded by class loaders and executed in a threaded environment by the JVM. Execution of JAVA(™) applications take place in threads, which are part of thread groups, and invokes calls to methods of the associated objects. Each thread that is created from a thread in a given thread group also belongs to that thread group. Executions of thread causes the creation of objects, which are stored in portions of the JAVA(™) heap during run time. An application is able to run on a JAVA(™) execution environment with a large set of JAVA(™) base classes, which are sometimes considered part of the JVM. The base classes received calls from the application to enable many basic functions.

Object creation during execution within the JVM utilizes a class loader architecture. There are two types of class loaders in the JAVA(™) execution environment. The first type is a "primordial" class loader, e.g. the primordial class loader 104. The primordial class loader is considered part of the JVM itself and is designed to load certain class loaders. Usually the primordial class loader 104 is used to load classes of the application.

Another type of class loader is available for loading objects. This type of class loader is a JAVA(™) class loader object written in JAVA(™). This type of class loader can be installed by a JAVA(™) application into a thread. When this type of class loader is installed into a thread other application objects within that thread are loaded using that class loader.

Notably the prior art JVM does not allow for a hierarchy of application class loaders. Thus, a JAVA(™) application such as the JAVA(™) application 108 cannot install additional application class loaders.

3. Conclusion

The prior techniques do not permit the execution of multiple unmodified JAVA(™) applications on a single unmodified JAVA(™) Virtual Machine. Further, the prior techniques do not support shared usage of the JAVA(™) base classes by applications running on the JVM. Accordingly, what is needed is a method and apparatus for supporting multiple unmodified JAVA(™) applications on a single JVM using a single copy of the base classes for all of the JAVA(™) applications.

SUMMARY OF THE INVENTION

A modified JAVA(™) execution environment is described. The modified environment supports multiple JAVA(™) applications on a single JAVA(™) virtual machine (JVM). This modified environment provides significant memory and performance improvements when running multiple applications on a single computer system. Notably, no changes are needed to the source code of an application to take advantage of the modified environment. Further, embodiments of the invention may support shared access to base classes through the use of overlays. Additionally, system resource permissions can be enforced based upon the user permissions associated with a running application. Notably, embodiments of the invention allow multiple applications to share the abstract window toolkit (AWT) on a per display basis. Since only a single garbage collection routine is necessary, applications see improved performance relative to running in different JVMs. Further, the shared base classes eliminate significant memory overhead.

According to some embodiments of the invention, a class loader and a thread group is dynamically generated for each application to be run in the modified environment. This class loader defines a name space for the application. Additionally, the thread group defines the set of threads for that application. The class loader also loads the application classes into the JVM. The application itself can have an application class loader, an application security manager, and/or create additional thread groups.

As necessary, when the overlaid base classes are called, the calling application can be determined. Two approaches are used by some embodiments of the invention. In the first approach, the class loader of the calling method is determined. This in turn allows the identification of the application through reference to data associated with the class loader. Another approach is to scan the thread group hierarchy of the JVM to identify a thread group with which application information has been associated by the class loader. Once the application is identified, the underlying base class functionality can be implemented using the appropriately selected files, resources, variable values, etc.

Additionally, embodiments of the invention can support system resource permissions, e.g. user access rights, on a per application basis. Each application can be associated with a user.

DETAILED DESCRIPTION

Figure 2:
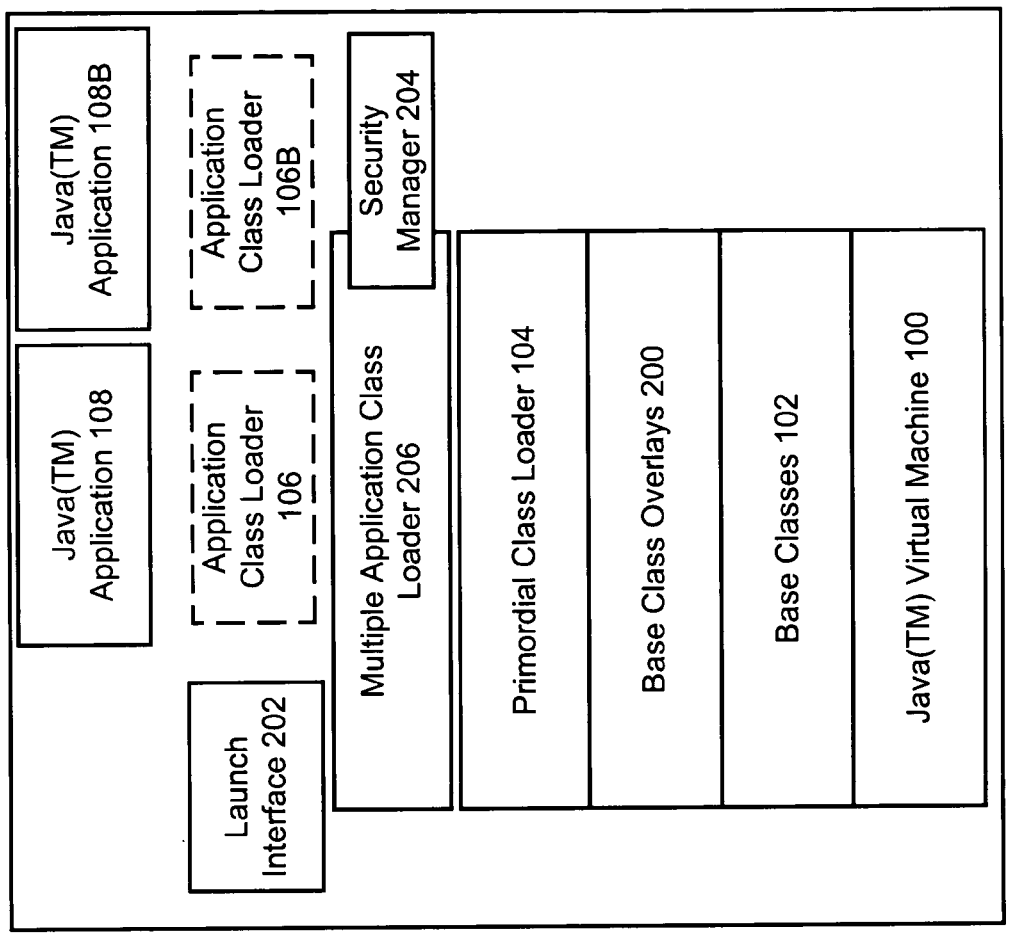
FIG. 2 illustrates a JAVA(™) Virtual Machine environment according to one embodiment of the invention.
Figure 1:
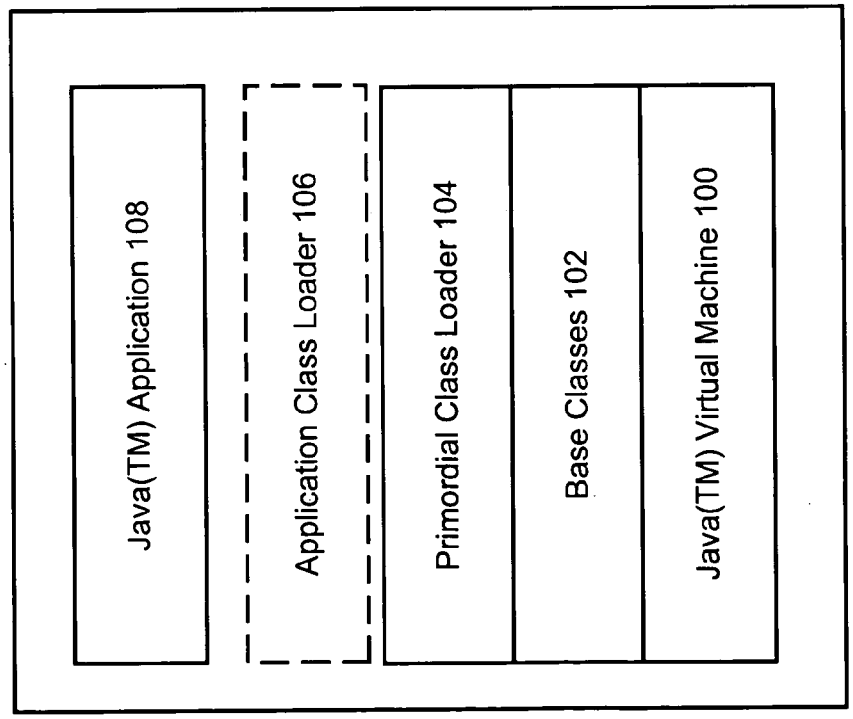
FIG. 1 illustrates a JAVA(™) Virtual Machine environment according to the prior art.

The modified JAVA(™) execution environment supported by embodiments of the invention will be described with reference to FIGS. 1 and 2. FIG. 1 shows the JAVA(™) execution environment according to the prior art and was described above. FIG. 2 shows the JAVA(™) execution environment according to one embodiment of the invention and will now be described in greater detail.

FIG. 2 shows the modified JAVA(™) execution environment according to one embodiment of the invention. Elements of FIG. 2 that are found in FIG. 1 are designated with the same reference numerals. For example, FIG. 2 includes the JVM 100. The JVM 100 used in FIG. 2 may be identical to the JVM 100 used in FIG. 1, but should at least be a substantially unmodified JVM.

The term "substantially unmodified" as used in this application refers to a JVM or JAVA(™) application suitable for use in the prior art JAVA(™) execution environment of FIG. 1. For example, a JVM supporting just in time (JIT) that can execute substantially unmodified JAVA(™) applications would be a substantially unmodified JVM. One further example may be instructive. A JAVA(™) application 108 is substantially unmodified, if it can be used in the execution environment of FIG. 1 without the need for source code—or byte code—modifications to run in the execution environment of FIG. 2.

Examples of substantially unmodified JVMs usable according to embodiments of the invention include JVMs from Sun Microsystems, Mountain View, Calif.; JVMs from Microsoft Corporation, Redmond, Wash.; JVMs from Apple Computer Corporation, Cupertino, Calif.; and/or other available JVMs. For the purposes of this discussion it will be assumed that the JAVA(™) Virtual Machine complies with a JAVA(™) standard and that the JAVA(™) applications similarly comply with a JAVA(™) standard.

The elements of FIG. 2 will now be described in greater detail. The substantially unmodified JVM 100 supports the modified execution environment of FIG. 2. The substantially unmodified JVM 100 includes base classes 102. The base classes 102 are substantially unmodified base classes suitable for use in a standard JAVA(™) execution environment such as the JAVA(™) execution environment of FIG. 1.

Additionally, FIG. 2 includes base class overlays 200. The base class overlays 200 provides support for multiple JAVA(™) applications using only a single copy of the base class 102. The base class overlays 200, allow multiple applications to reference the base classes 102 without conflicts due to different access privileges and/or base class definitions that inhibit sharing. The base class overlays 200 will be described in further detail below. The modified JAVA(™) execution environment also includes a primordial class loader 104 that is substantially unmodified and suitable for use according to the prior art JAVA(™) execution environment.

The modified JAVA(™) execution environment includes a multiple application class loader 206. This class loader provides support for multiple applications. Additionally, a security manager 204 provides for different degrees of access to different applications based on privileges. The multiple application class loader 206 handles the class loading of JAVA(™) applications within the modified execution environment of FIG. 2.

Compare this to the standard execution environment of FIG. 1, where the primordial class loader 104 would load the JAVA(™) application 108. According to the modified execution environment of FIG. 2, the multiple application class loader 206 would invoke the JAVA(™) application 108.

In order to support the launch of multiple applications, a launch interface 202 is provided. The launch interface 202 may itself be a JAVA(™) application. The launch interface 202 may provide a command line interface or other interface for invoking the execution of JAVA(™) applications within the modified execution environment of FIG. 2. The launch interface 202 may itself be loaded by the multiple applications class loader 206 as a JAVA(™) application running within the modified JAVA execution environment. In some embodiments, the launch interface may respond to remote procedure invocations, or some other type of message, and execute applications according to parameters specified in the message. In some embodiments, the launch interface 202 provides a UNIX-style command line interface with log in and security procedures.

The depiction of the multiple application class loader 206 as a single class loader for all applications is a simplification. In fact, a class loader is dynamically generated for each application. Thus, the launch interface 102, the JAVA(™) application 108, and the JAVA(™) application 108B each has a dynamically generated multiple application class loader 206 responsible for loading the appropriate application classes. Each of the dynamically generated multiple application class loaders can define its own namespace within which the loaded applications will execute.

As shown in FIG. 2, once invoked from the launch interface 202, JAVA(™) applications (e.g. the JAVA(™) application 108) can have their respective classes loaded within the modified execution environment of FIG. 2. Similarly a second application, the JAVA(™) application 108B could be loaded within the modified execution environment of FIG. 2. These two applications would be sharing the same JAVA(™) Virtual Machine 100 and the same base classes 102. However, the multiple application class loader 104 would place them in separate namespaces and would place them in different thread groups. The base class overlays 200 ensure appropriate behavior of the base classes 102 for each of the applications.

Notably, neither the JAVA(™) application 108 nor the JAVA(™) application 108B need to be modified at the source code level to operate within the modified execution environment. The environment of FIG. 2 is transparent to JAVA(™) applications running in the environment.

The modified execution environment of FIG. 2 only needs a single garbage collection process and a single copy of the base classes 102. This provides significant memory and speed savings. In some experiments, this reduced the memory overhead to enable execution of over one hundred JAVA(™) applications on a single JVM—on a single server computer, which would otherwise support only fourteen of these applications at the same time. See also, Jürgen G. Kienhöfer, "Java Junction: Perkup, SCO Server Side Java Technology", in SCO Coredump, Summer 1999, Number 13, page 8, also available at <http://www.sco.com/developer/core13/perkup.htm>.

The security manager 204 is an addition to the inherent security models of JAVA(™). Prior art JVMs were typically invoked on client machines by a specific user and the single application ran with that user's privileges. In contrast, the execution environment of FIG. 2 would typically be invoked with system privileges such as "root" on UNIX-like systems. As a result, each running application would, without additional security, be capable of accessing the entire system. Therefore, a security manager 204 can be provided to enforce operating system security—or other security—requirements.

In one embodiment of the invention, the security manager 204 uses parameters provided via the launch interface 202 to control the permissions granted to running applications. For example, if using the launch interface 202 an application is invoked using the privileges of "user 1", the security manager 204 would enforce operating system file permissions and resource permissions for that application according to the privileges granted to "user 1". Examples of enforced requirements include those for:

reading, writing, creating, deleting, modifying, or examining system resources such as files and sockets;
  listening or accepting network connections to a reserved port;
  executing a program on the system or starting a sub process
  terminating the JAVA(™) run time environment of FIG. 2
  loading dynamic libraries and native methods. Thus if the permissions on a particular file "x" indicate that it is owned by "user 2" and not readable by other users, an attempt by a JAVA(™) application running as "user 1" to read the file may be denied.

Each application running in the environment of FIG. 2 may also have its own security management policies—for example, a set of JAVA(™) sandbox policies.

Part of the base class overlays 200 involves the separation of certain resources that are not effectively shared between different programs. For example, the standard java.lang.system class uses static variables to define the input, output and errors streams. As a result, it is not possible to share that class without modification of the base classes. In this instance, the base class can be overlaid with modifications that can use two possible processes—possibly in conjunction with one another—to determine the current application and provide appropriate access to the shared base class.

One process used by overlaid, or shared, classes to identify the correct application is to identify the class loader for the calling thread. If the class loader is an instance of the dynamically generated multiple application class loader, then it together with the namespace can be used to identify the application. Consequently, the correct resource permissions, list of accessible files, input and output devices, etc., are identified for use by the shared class.

The above approach may fail if the class loader for the object accessing the overlaid class is the primordial class loader 104. In that instance, the associated namespace may not provide adequate information to suitably identify the application and needed information.

Therefore, a second approach to determining the calling process can be used. In this case, the thread data structures within the JVM 100 can be examined to determine the calling object's thread. Then, the group for the thread can be identified. Information associated with the thread group about the application and its properties can then be identified. If necessary, the thread group hierarchy can be recursively examined until a thread group is found that is associated with information about the process.

As seen in the execution environment of FIG. 2, the multiple application class loader 206 does extend the JVM 100 to support application class loaders in addition to the multiple application class loader 206. In some embodiments, it is necessary to configure the JVM not check for multiple class loaders to enable this capability. In other embodiments this change is not necessary if the JVM itself already supports hierarchies of class loaders.

The base class overlays 200 may involve adding checks for resource permissions. For example, the procedures for reading file must be overlaid to include identification of the user for the application, as described above, as well as verification of the user's rights with respect to that file. These changes to the base classes may be implemented in the base class overlays 200, in the security manager 204, or in a combination of the two.

The terms "program", or "computer program", as used in this application, refers to any sequence of instructions designed for execution on a computer system. A program may include a subroutine, a function, a procedure, an object method, an object implementation, an executable application, an applet, a servlet, a source code, an object code, and/or some other sequence of instructions designed for execution on a computer system.

The base class overlays 200, the multiple application class loader 206, and the security manager 204 may be embodied as one or programs included in one or more computer usable media such as CD-ROMs, floppy disks, or other media.

Some embodiments of the invention are included in an electromagnetic wave form. The electromagnetic waveform comprises information such as base class overlays, a multiple application class loader, and a security manger for use in a modified JAVA(™) execution environment. The electromagnetic waveform may include the multiple application class loader accessed over a network.

The foregoing description of various embodiments of the invention has been presented for purposes of illustration and description. It is not intended to limit the invention to the precise forms disclosed. Many modifications and equivalent arrangements will be apparent.

What is claimed is:

1. A modified transportable byte code execution environment comprising:
   a substantially unmodified transportable byte code virtual machine;
   a set of substantially unmodified base classes;
   one or more overlays to the set of substantially unmodified base classes, the one or more overlays enabling corresponding base classes to support shared access by one or more substantially unmodified transportable byte code applications;
   an unmodified primordial class loader for loading the system base classes as overlaid by the one or more overlays to the base classes;
   a security manager supporting multiple applications and for limiting access to system resources according to user permissions; and
   a dynamic class loader generator for creating a class loader for loading an application, the application classes and creating a thread group for the application;
   wherein in response to an object of a first application requesting a resource of a shared base class, the one or more overlays are configured to identify properties of the first application by:
      identifying a first class loader that loaded the object;
      if the object was loaded by a first class loader that was created for the application, using information in the first class loader and its associated namespace to identify the properties of the first application; and
      if the object was loaded by the primordial class loader, identifying a first thread group created for the first application and using information associated with the first thread group to identify the properties of the first application.

2. The modified transportable byte code execution environment of claim 1, wherein the application includes at least one of an application class loader and an application security manager.

3. The modified transportable byte code execution environment of claim 1, wherein the one or more overlays include overlays to file classes to limit access to system resources according to user permissions associated with the application.

4. The modified transportable byte code execution environment of claim 1, wherein the application includes one or more invocations of Abstract Window Toolkit (AWT) classes.

5. The modified transportable byte code execution environment of claim 1, wherein the one or more overlays support determining a calling application.

6. The modified transportable byte code execution environment of claim 5, wherein the determining a calling application comprises identifying the class loader of a calling method, and using the class loader to identify the application.

7. The modified transportable byte code execution environment of claim 5, wherein the determining a calling application comprises identifying the thread group for a calling method, and using the thread group to identify the application.

8. A method of supporting a number of applications in a single transportable byte code execution environment, the method comprising:
   generating a class loader for each of the applications in the number of applications, the class loader providing a name space for each application, and a thread group for each application;
   overlaying one or more substantially unmodified base classes to support the number of applications;
   determining a calling application for a method; and
   limiting access by the number of applications to system resources according to user permissions; and
   in response to an object of a first application requesting a resource of a shared base class:
      identifying a first class loader that loaded the object;
      if the object was loaded by a first class loader that was created for the application, using information in the first class loader and its associated namespace to identify properties of the first application; and
      if the object was loaded by the primordial class loader, identifying a first thread group created for the first application and using information associated with the first thread group to identify the properties of the first application.

9. The method of claim 8, wherein at least one of the number of applications includes an application class loader.

10. The method of claim 8, wherein at least one of the number of applications includes an application security manager.

11. A computer data signal embodied in a carrier wave comprising:
   a computer program for supporting a number of substantially unmodified transportable byte code applications on a substantially unmodified transportable byte code virtual machine, the transportable byte code virtual machine including a set of substantially unmodified base classes and a substantially unmodified primordial class loader, the program comprising:
      a first set of instructions for generating a class loader for each of the transportable byte code applications in the number of substantially unmodified transportable byte code applications, the class loader providing a name space for each application, and a thread group for each application, the first set of instructions further associating a user with each application;
      a second set of instructions for overlaying one or more substantially unmodified base classes to support the number of applications;
      a third set of instructions for determining a calling application for a method; and
      a fourth set of instructions for limiting access to a system resource by an application according to whether the user associated with the application has access to the system resource, wherein the application also has its own security management policies; and
      a fifth set of instructions for, in response to an object of a first application requesting a resource of a shared base class:
         identifying a first class loader that loaded the object;
         if the object was loaded by a first class loader that was created for the application, using information in the first class loader and its associated namespace to identify properties of the first application; and
         if the object was loaded by the primordial class loader, identifying a first thread group created for the first application and using information associated with the first thread group to identify the properties of the first application.

* * * * *

UNITED STATES PATENT AND TRADEMARK OFFICE
CERTIFICATE OF CORRECTION

PATENT NO. : 6,931,544 B1  Page 1 of 1
DATED : August 16, 2005
INVENTOR(S) : Jurgen Kienhofer et al.

It is certified that error appears in the above-identified patent and that said Letters Patent is hereby corrected as shown below:

Column 1,
Line 49, please replace "riot" with -- not --.

Signed and Sealed this

Twenty-seventh Day of December, 2005

JON W. DUDAS
*Director of the United States Patent and Trademark Office*